(No Model.)
E. STEPHENS.
TUBULAR IRON RAILING.
No. 381,289. Patented Apr. 17, 1888.
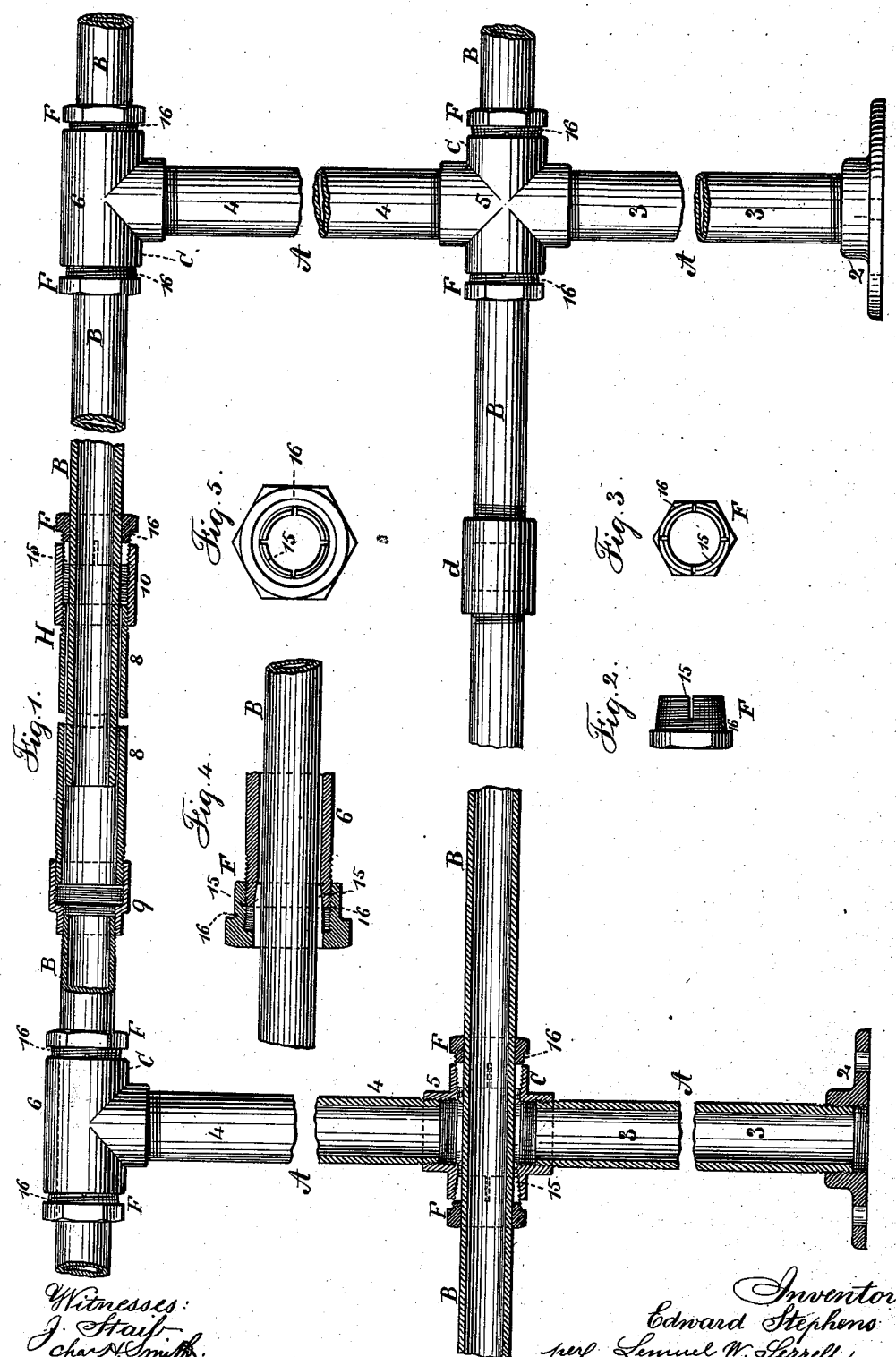

UNITED STATES PATENT OFFICE.

EDWARD STEPHENS, OF ARLINGTON, NEW JERSEY, ASSIGNOR TO EDWARD C. STEPHENS, OF SAME PLACE.

TUBULAR IRON RAILING.

SPECIFICATION forming part of Letters Patent No. 381,289, dated April 17, 1888.

Application filed August 8, 1887. Serial No. 246,398. (No model.)

*To all whom it may concern:*

Be it known that I, EDWARD STEPHENS, of Arlington, in the county of Hudson and State of New Jersey, have invented an Improvement in Tubular Iron Railing, of which the following is a specification.

In bridges and elevated railway structures, &c., iron railings have been made with tubular posts and tubular rails, the posts having + and T couplings, through which the tubular rails are passed, and efforts have been made to connect the parts by wedges and nuts that are separate from the wedges; but in practice it is found that the expansion and contraction of the tubular rails loosen the wedges, and the nuts, being separate, are loose and shake, so as to become unscrewed, and the parts rattle, and finally become separated.

In my invention I combine, with the rails and posts, screw-nuts and segmental wedges made in one, so that the nut portion tightens the wedge portions around the pipe, and the wedge portions prevent the nut portions revolving and becoming loose, and I provide for expansion and contraction, so that the rails always remain in line, and the posts are not loosened or displaced.

In the drawings, Figure 1 is an elevation, partially in section, showing two posts and the crossing rails, the intermediate parts of the tubes being removed to bring the couplings nearer together. Fig. 2 is an elevation detached, and Fig. 3 an end view of the combined nut and wedge. Fig. 4 is a section of a modification of the combined nut and wedge, and Fig. 5 is an end view of the same.

The columns or posts A are made with base-plates 2, tubes 3 and 4, +-shaped couplings 5, and T-shaped couplings 6, and there are two, three, or more tubular rails, B. The posts shown are only adapted to two rails. The horizontal tubular portions $c$ of the couplings 5 and 6 are sufficiently large for the tubular rails B to be freely slipped through these tubular portions $c$, and connected together at their ends by straight couplings $d$; but in slipping the tubes through the posts in succession the combined nuts and wedges F are slipped on, so as to remain ready for use in clamping the posts and rails together, as soon as the parts have been put in place for the desired distance, so that the parts remain loose and in a condition to be easily placed and adjusted until ready for being clamped. In consequence of the tubular portions $c$ being larger in internal diameter than the rails B are in external diameter, the tubular rails can be inserted and slipped along through three or four of the vertical posts without displacing such posts, the parts springing slightly to allow this to be done.

Each combined nut and tubular wedge F is formed of one piece, the tubular wedge portion 15 having longitudinal incisions or saw-cuts, that allow the segments to be forced or sprung toward each other in clamping the pipe, and the nut portion 16 is adapted to screw into the end of the coupling-tube $c$, as in Figs. 1, 2, and 3, or upon the outside of the coupling-tube $c$, as in Figs. 4 and 5. Under either construction the nut and tubular wedge are in one piece, and the tubular wedge, when forced into the end of the coupling-tube $c$, is closed around the pipe or rail B sufficiently to grasp the same and prevent looseness; but it should not be so tightly screwed as to prevent the end movement of rail B as the metal expands or contracts.

Neither the coupling-nut nor the wedge is liable to move or become loose, as the nut portion prevents the wedge being moved endwise by the expansion or contraction of the rail, and the weight of the rail and the contact thereof with the inside of the tubular wedge prevent the wedge or nut revolving and unscrewing.

The expansion-joint H should be introduced in the rails B about every three hundred feet, more or less. This joint is composed of the tube 8, connected by a reducer, 9, to one end of one tubular rail, and the end of the adjacent tubular rail is within this tube 8, and there is a combined nut and wedge, F, around this tubular rail, and the same is screwed into the inside of the tube 8, or by preference into the inside of the coupling 10. By this construction the parts are free to expand or contract by the end movement within the tube 8.

The ends of the tubular portions $c$ of the couplings are preferably slightly conical at their inner surfaces for the tubular wedges to come into contact with, and these surfaces are screw-threaded when the wedge and nut are in the form shown in Figs. 1 and 2.

I claim as my invention—

1. The combination, with the rails and the posts and tubular couplings through which the rails pass, of the combined nuts and tubular wedges, each being in one piece, so that the wedges are held in place by the nuts, and the nuts are held from turning by the wedges, substantially as set forth.

2. The combination, with the tubular posts and couplings, and the tubular rails passing through the coupling, of the reducer 9, the tube 8, and the combined nut and tubular wedge, forming an expansion-joint, substantially as set forth.

Signed by me this 4th day of August, A. D. 1887.

EDWARD STEPHENS.

Witnesses:
 LEMUEL W. SERRELL,
 WILLIAM G. MOTT.